United States Patent [19]

Dominguez et al.

[11] Patent Number: 5,283,316
[45] Date of Patent: Feb. 1, 1994

[54] POLYMERS WITH HIGH REFRACTIVE INDEX AND LOW OPTICAL DISPERSION

[75] Inventors: Ligia Dominguez; Wolfgang H. Meyer; Ullrich Simmrock; Gerhard Wagner, all of Mainz, Fed. Rep. of Germany

[73] Assignee: Max-Planck-Gesellschaft Zur Fordrung Der Wissenchaften, Cottingen, Fed. Rep. of Germany

[21] Appl. No.: 893,908

[22] Filed: Jun. 4, 1992

Related U.S. Application Data

[62] Division of Ser. No. 507,306, Jan. 10, 1990, abandoned.

[30] Foreign Application Priority Data

Apr. 13, 1989 [DE] Fed. Rep. of Germany ....... 3912224

[51] Int. Cl.$^5$ .............. C08F 8/26; C08F 8/30; C08F 8/34; C08F 8/42
[52] U.S. Cl. ............... 528/397; 521/25; 521/32; 525/327.1; 525/337; 525/343; 525/344; 525/355; 525/360; 525/363; 525/374; 525/377; 526/265; 528/398
[58] Field of Search .............. 528/397; 525/370, 363, 525/327.1; 526/265

[56] References Cited

U.S. PATENT DOCUMENTS

| | | | |
|---|---|---|---|
| 3,784,529 | 1/1974 | Bayer | 528/397 |
| 3,835,102 | 10/1974 | Shinohara | 528/397 |
| 3,862,094 | 1/1975 | Shinohara | 528/397 |
| 4,102,863 | 7/1978 | Buchwalter | 525/523 |
| 4,107,099 | 8/1978 | Hedge | 521/30 |
| 4,218,554 | 8/1980 | Foley, Jr. | 526/264 |
| 4,247,476 | 1/1981 | Haase | 528/397 |
| 4,287,331 | 9/1981 | Phillips | 528/397 |
| 4,390,689 | 6/1983 | Jacquet | 528/397 |
| 4,567,206 | 1/1986 | Matsui | 521/27 |
| 4,659,744 | 4/1987 | Matsui | 521/32 |
| 4,775,591 | 10/1988 | Campbell | 428/403 |
| 4,780,511 | 10/1988 | Crivello | 525/353 |
| 4,801,359 | 1/1989 | Jeanne | 204/1 T |
| 4,900,420 | 2/1990 | Kurauchi | 204/296 |
| 4,904,701 | 2/1990 | Hiyoshi | 521/32 |
| 4,909,913 | 3/1990 | Fukuda | 521/25 |

FOREIGN PATENT DOCUMENTS 1559680  1/1980  United Kingdom ........ C08G 73/02

OTHER PUBLICATIONS

"Solution Properties of Novel Polyelectrolytes" by D. Casson & A. Rembaum Apr. 15, 1971.
"Ionene Polymers: Preparation, Properties and Applications" by Tetsuo Tsutsui.

*Primary Examiner*—Joseph L. Schofer
*Assistant Examiner*—Fred Zitomer

[57] ABSTRACT

The present invention provides a process for the production of polymers with an optical position in diagram where refraction index $n_D$ is plotted against optical dispension $\nu_D$ expedient for an optical use by metathetic counterion exchange, wherein, in a polymer of the general formula:

$$-\left[\left(R_1-\underset{\underset{X^-R_3}{|}}{\overset{\overset{R_3}{|}}{N^+}}\right)_y-R_2-\underset{\underset{X^-R_4}{|}}{\overset{\overset{R_4}{|}}{N^=}}\right]_n- \quad (I)$$

$R_1$ and $R_2$, which can be the same or different, are divalent organic radicals, $R_3$ and $R_4$, which can be the same or different, are monovalent organic radicals, n is a whole number greater than 2 and y is 0 or 1. $R_1$, $R_2$, $R_3$, $R_4$, y and n are so chosen that together they form a polymeric basic structure which promotes glass formation and prevents crystallisation, and $X^-$ is a halogen atom. The halogen ion is replaced by an equivalent of a mono- or polyvalent organic or inorganic counterion different from the halogen ion and suitable for the adjustment of the desired solid body properties.

Because of their outstanding optical properties (high refractive index in conjunction with low optical dispersion), these polymers are very suitable for a great variety of uses in optics, for example for optical construction parts, such as Fresnel lenses and lightwave conductors, and as optical coatings.

1 Claim, 7 Drawing Sheets

POLYMERS WITH HIGH REFRACTIVE INDEX AND LOW OPTICAL DISPERSION

This is a divisional of co-pending application Ser. No. 07/507,306 filed on Apr. 10, 1990 abandoned.

The present invention is concerned with a process for the production of polymers with a high refractive index and low optical dispersion.

On the basis of their "optical position" in a diagram where refraction index $n_D$ is plotted against optical dispension $v_D$, the use of transparent synthetic resins in optics is limited. The refractive index $n_D$ of known polymers lies in the range of approximately 1.35 to 1.70 and it was assumed that a widening of this range upwardly or downwardly was not possible (cf. for example H. Dislich, Angew. Chem., 91, 52–61/1979); for the optical dispersion, the range extends between the Abbé numbers of about 20 to about 70. Exceptions, such as for example poly-N-vinylcarbazole, with a relatively high refractive index $n_D$, possess a high dispersion (low Abbé number). Conversely, other exceptions, such as for example tetrafluoroethylene-hexafluoropropylene copolymer (Teflon FEP), possess a relatively low optical dispersion (high Abbé number) and a low refractive index. However, for many optical uses, a high refractive index is desired in combination with a low optical dispersion (high Abbé number). Therefore in the past, this field of use has been reserved to glasses (cf. H. Dislich, loc. cit.).

Therefore, it is an object of the present invention to provide polymers which, on the basis of their optical properties and appropriate mechanical and chemical properties, are able to extend and/or widen the field of use of synthetic resins in optics and, in particular, to provide polymers which have a high refractive index especially in conjunction with a low optical dispersion.

SUMMARY OF THE INVENTION

We have now found that it is possible in cationic polyelectrolytes (ionenes) precisely to adjust the desired mechanical and optical solid body properties (high refractive index, especially in combination with a low dispersion) when the polymer basic structure, which is formulated to promote glass formation and to prevent crystallisation, is combined with an appropriate counterion.

Thus, according to the present invention, there is provided a process for the production of polymers (cationic polyelectrolytes) with an optical position in the $n_D$-$v_D$ diagram expedient for an optical use, i.e., the polymers have a high refractive index in combination with a low dispersion. Such polymers are formed, by metathetic counterion exchange, wherein, in a compound of the general formula:

(I)

$R_1$ and $R_2$, which can be the same or different, are divalent organic radicals, $R_3$ and $R_4$, which can be the same or different, are monovalent organic radicals, n is a whole number greater than 2 and y is 0 or 1. $R_1$, $R_2$, $R_3$, $R_4$, y and n are so chosen that together they form a polymer basic structure which promotes glass formation and prevent crystallisation, and $X^-$ is a halogen ion. The halogen ion is replaced by an equivalent of a mono- or polyvalent organic or inorganic counterion which is different from a halogen ion and is suitable for the adjustment of the desired solid body properties.

The polymers of general formula (I) are polymers which are characterised by quaternary nitrogen ions covalently bound to the polymer chain ionenes and thus are cationic polyelectrolytes (ionenes).

In general formula (I), $R_1$ and $R_2$ preferably are saturated or unsaturated alkylene, arylene or aralkylene radicals or heterocyclic radicals which can be interrupted by one or more heteroatoms or heteroatom-containing groups, for example ester, ether, amide, carbonate or urethane groups. $R_1$ and/or $R_2$ can also represent or contain a divalent polymer chain, for example a polyalkylene chain.

$R_3$ and $R_4$ are preferably branched or more preferably straight-chained alkyl radicals, $R_3$ and $R_4$ or can be derived from a divalent radical $R_1$ and/or $R_2$. One or preferably both radical pairs $R_3$ and $R_4$ can together also form a divalent radical, preferably an alkylene radical. The radicals $R_3$ and/or $R_4$ can also be divalent and, as substituents of the radicals $R_1$ and/or $R_2$, form, together with these and the nitrogen atom, a heterocycle, for example a piperidine ring.

A counterion $X^-$ different from a halogen ion is preferably an equivalent of a one to four valent organic or inorganic counterion. $X^-$ is preferably low molecular.

n is preferably from 5 to 1000 and more preferably from 50 to 300.

The production of polyelectrolytes of general formula (I) in which $X^-$ is a halogen ion and the properties thereof are known from the literature (cf. A. Rembaum et al., J. Polym. Sci., Polym. Lett. Ed., 8, 159/1968; M. F. Hoover, J. Macrobiol. Sci.-Chem., A 4 (6), 1373–1386/1970; T. Tsutsui in "Development in Ionic Polymers - 2", A. D. Wilson and H. J. Prosser eds., pub. Elsevier Science, New York, 1986). Because of the material properties and especially because of their hygroscopy, these halide salts are substantially uninteresting for a technical use.

Surprisingly, we have now found that by means of an exchange of the halide ion by an equivalent of another counterion $X^-$, in the scope of the above-given meanings, the material properties of the polymers of the general formula (I) can be precisely changed and adjusted. Most of the physico-chemical properties with regard to the solid material properties, especially the softening temperatures, the crystallinity and the solubility, can be varied by the counterion exchange in such a way that they correspond substantially or completely to the desired properties for use in optics in many fields. In particular, the polymers of general formula (I) according to the present invention possess outstanding optical properties. It has been shown that by means of suitable counterions $X^-$, the refractive index of polymers of the general formula (I) can be so varied that values of refractive index of up to about 2.0 can be achieved. Besides a high refractive index, the polymers of general formula (I) according to the present invention generally display a low optical dispersion. Because of their favourable "optical position" in the $n_D$-$v_D$ diagram (relatively high refractive index $n_D$ in comparison with a relatively high Abbé number $v_D$), with the polymers of general formula (I) according to the present invention, optical ranges can thus be included which were previously reserved typically to inorganic glasses. The adjustment of the optical properties thereby takes place primarily by the metathetical counterion exchange, i.e. by the combination of the polymer basic structure with an appropriate counterion. By means of an appropriate choice and combination of organic and inorganic structural elements which, in the case of the polymers of general formula (I) according to the present invention, can be so linked with one another that no phase separations or other kinds of demixing phenomena are to be expected, it is possible, in a simple manner, to adjust the optimum properties desired for the particular field of use.

DETAILED DESCRIPTION OF THE INVENTION

In preferred embodiments, the structural elements of the polymers of general formula (I) have the radicals, structural formulae and/or combinations described hereinbefore and hereinafter as being preferred. The combinations which are most preferred for the particular field of use (structure of the polymer basic structure and nature of the counterion $X^-$) can easily be determined by a few orientating experiments.

A saturated or unsaturated alkylene radical $R_1$ or $R_2$ preferably contains 2 to 30 and preferably 3 to 15 carbon atoms and is, for example a trimethylene, hexamethylene, decamethyl or eicosamethylene radical or the grouping —CH$_2$—CH=CH—CH$_2$—; an arylene or aralkylene radical is preferably derived from a naphthylene and preferably from a phenylene radical and is, for example, a 2,6-naphthylene or 1,4-phenylene radical, or is formed by one or two aromatic radicals which are linked via an alkylene grouping with one another and/or with the nitrogen atom and is, for example, the grouping:

or the grouping wherein x is preferably from 1 to 4. Instead of the aryl radical, there can also be present a heterocyclic divalent residue, for example one derived from pyridine or quinoline.

A straight-chained or branched alkyl radical $R_3$ or $R_4$ is preferably an alkyl radical containing up to 7 carbon atoms and more preferably up to 4 carbon atoms, for example n-butyl, tert-butyl, isobutyl, n-propyl, isopropyl radical and is most preferably an ethyl radical and particularly a methyl radical.

$X^-$ can be an equivalent of an organic or inorganic simple ion or of a complex ion, for example of the type [MY$_4$] or [MY$_6$]. Preferred examples of such ions include TOS$^-$, CF$_3$SO$_3^-$, DoSO$_4^-$, BF$_4^-$, ClO$_4^-$, PF$_6^-$, SbF$_6^-$, SCN$^-$, BPh$_4^-$, FeCl$_4^-$, SO$_4^{2-}$, PbCl$_6^{2-}$, [Fe(CN)$_6$]$^{3-}$, [Fe(CN)$_6$]$^{4-}$, [SO$_3$PhSO$_3$]$^{2-}$ and MY$_4^{2-}$, wherein M is zinc, cadmium or mercury and Y is chlorine, fluorine or iodine, for example ZnCl$_4^{2-}$, ZnBr$_4^{2-}$, ZnI$_4^{2-}$, CdI$_4^{2-}$ or HgI$_4^{2-}$ (TOS=tosylate, Ph=phenyl, DoSO$_4$=dodecyl sulphate). There can also be present two or more different ions $X^-$ in a polymer of general formula (I), for example BF$_4^-$/PF$_6^-$ in a ratio of 1:1.

In the following are given some preferred embodiments of the polyelectrolytes of general formula (I) produced according to the present invention (which can also be referred to as "ionenes"); the designations given for the individual ionics correspond to the nomenclature which is conventional for ionics.

a) Asymmetric ionenes:
(I-1, m-R-X ionenes)

l=number of methylene groups in the N,N,N',N'-tetraalkyl-α,ω-diaminoalkane
m=number of methylene groups in the α,ω-dibromoalkane
R=side chain on the nitrogen
$X^-$=counter ion.

b) Symmetric ionenes:
(I-m-R-X ionenes)

m=number of the methylene groups in the N,N,N'-N'-tetraalkyl-α,ω-diaminoalkane and in the α,ω-dibromoalkane.

c) Trimers:
(T-m-eR$_1$-X trimers)

eR₁ = alkyl end group.

d) Ionics with DABCO units (DABCO=1,4-diazo[2.2.2]-bicyclooctane)
(I-DABCO-m-X ionenes)

m = number of methylene groups in the α,ω-dibromoalkane.

e) Aromatic ionenes from p-xylylene dibromide (I-pXy-X ionenes)

f) (I-D$_o$/Pip-Me-X)

For the metathetic exchange of halide ions for the counterions according to the present invention, the corresponding halides are used as starting materials which can be obtained, for example, by the reaction of an α,ω-dibromo compound of the general formula Br-R$_2$-Br, in which R$_2$ has the above-given meaning, with an N,N,N',N'-tetramethyl-α,ω-di amino compound of the general formula (R$_3$)$_2$—N—R$_1$—N—(R$_4$)$_2$, in which R$_1$, R$_2$ and R$_3$ have the above-given meanings (cf. A. Rembaum et al., loc. cit.)

In these halides (preferably chlorides or bromides), the exchange by the counterion X$^-$ can take place according to one of the following methods:

1. Treatment of the dissolved halides with a silver salt solution which contains the desired anion (reaction 1). If the silver salt of the counterion which is to be introduced is not available, then the hydroxide is prepared by reaction with moist silver oxide which can than be converted almost as desired by neutralisation with an acid (reaction 2).

2. By the direct addition of an acid (or of an alkali metal salt thereof) with the appropriate counterion X$^-$.

3. By alkylating ion exchange with ethylene oxide according to reaction 3:

$$[R_4N]^+Y^- + HOCH_2CH_2X$$

with the proviso that the halogen ion to be replaced is more nucleophilic than the counterion X$^-$ to be introduced (cf. O. Sackur, Bulletin de la Société Chimique de France, 19(5), 796/1952).

According to the present invention, it is preferred to work according to method 1 or 2. As salt in method 2, it is preferred to use the potassium salt. The individual process steps cant thereby be carried out in a manner per se known for such reactions under the conditions known and usual therefor, for example temperature, pressure and solvents.

Therefore, one embodiment of the present invention concerns a process wherein a compound of the general formula (I), in which X$^-$ is a halogen ion, preferably a chloride or bromide ion, (i) is reacted with a silver salt which contains the desired ion X$^-$ to be introduced, or (ii) is converted into the hydroxide by reaction with moist silver oxide and the so obtained hydroxide is neutralised with an acid which contains the desired ion X$^-$ to be introduced, or (iii) is reacted with an acid or the alkali metal salt with the desired ion X$^-$ to be introduced, or (iv) with the proviso that the halide to be used is more nucleophilic than the desired ion X$^-$ to be introduced, is reacted with ethylene oxide in the presence of an acid which contains the desired ion X$^-$ to be introduced.

Especially in the case of process variants (i), (ii) and (iii), the process according to the present invention leads to a practically quantitative ion exchange.

In the following Table 1, there is given the preferred process for some typical counterions X$^-$ according to the present invention:

TABLE 1

| Method I: | ion exchange by use of the silver salts of the desired counterions: TOS$^-$, CF$_3$SO$_3^-$, DoSO$_4^-$, SO$_4^{2-}$, [Fe(CN)$_6$]$^{3-}$, [SO$_3$PhSO$_3$]$^{2-}$ |
|---|---|

TABLE 1-continued

Method II: ion exchange by the addition of the acid or of the potassium salt of the counterions to be introduced:
$BF_4^-$, $ClO_4^-$, $PF_6^-$, $SbF_6^-$, $SCN^-$, $BPh_4^-$, $FeCl_4^-$, $ZnCl_4^{2-}$, $ZnBr_4^{2-}$, $ZnI_4^{2-}$, $HgI_4^{2-}$, $CdBr_4^{2-}$, $CdI_4^{2-}$ In the following Tables 2 to 5, there are summarised the results of the ion exchange obtained with various ionenes of the general formula (I) (the halide starting compound is bromide; the percentage values of the ion exchange were determined by elementary analysis).

TABLE 2

Results of the ion exchange in the case of I-6-Me-X ionenes

| counterion | Y | percentage of the ion exchange (%)[1] | residual bromine content (%)[2] | drying loss (%)[2] |
|---|---|---|---|---|
| $Cl^-$ | Cl | 88.0 | — | 6.1 |
| $TOS^-$ | S | 95.0 | <0.1 | 2.6 |
| $CF_3SO_3-$ | F | 98.7 | 0.1 | 1.8 |
| $DoSO_4^-$ | S | ~100.0 | 0.6 | 0.7 |
| $BF_4^-$ | F | 87.0 | 0.4 | 2.5 |
| $ClO_4^-$ | Cl | 99.0 | <0.05 | 1.9 |
| $PF_6^-$ | F | 98.0 | 0.51 | 1.2 |
| $SbF_6^-$ | F | 97.8 | 1.18 | 1.6 |
| $SCN^-$ | S | 81.9 | — | 2.9 |
| $BPh_4^-$ | — | — | 4.39 | 3.7 |
| $FeCl_4^-$ | Cl | 99.5 | — | 2.7 |
| $ZnCl_4^{2-}$ | Cl | 99.0 | — | 0.1 |
| $ZnBr_4^{2-}$ | Br | ~100.0 | — | 3.5 |
| $ZnI_4^{2-}$ | I | 61.9 | — | 1.2 |
| $CdI_4^{2-}$ | I | 78.7 | — | 0.4 |
| $HgI_4^{2)}$ | I | ~100.0 | — | 0.3 |
| $[Fe(CN)_6]^{3-}$ | Fe | 92.0 | 3.57 | 5.1 |
| $[Fe(CN)_6]^{4-}$ | Fe | ~100.0 | 0.18 | 1.3 |
| $[SO_3PhSO_3]^{2-}$ | S | 95.8 | — | 2.6 |

[1]percentage of theory, referred to the elementary analysis of Y.
[2]statement in weight percent water loss after the samples had been dried for 48 hours at 40° C. under vacuum (2 mbar).

TABLE 3

Results of the ion exchange in the case of I-6-Et-X ionenes

| counterion | Y | percentage of the ion exchange (%)[1] | drying loss (%)[2] |
|---|---|---|---|
| $TOS^-$ | S | 97.0 | 0.5 |
| $CF_3SO_3^-$ | F | 97.8 | 3.1 |
| $BF_4^-$ | F | 97.0 | 0.2 |
| $PF_6^-$ | F | 99.3 | 0.6 |
| $SbF_6^-$ | F | 99.3 | 0.7 |
| $ZnBr_4^{2-}$ | Br | ~100.0 | 2.3 |

[1]percentage of theory referred to the elementary analysis of Y
[2]statement in weight percent water loss after the samples had been dried at 40° C. under vacuum (2 mbar)

TABLE 4

Results of the ion exchange in the case of I-10-Me-X ionenes

| counterion | Y | percentage of the ion exchange (%)[1] | drying loss (%)[2] |
|---|---|---|---|
| $TOS^-$ | S | ~100.0 | 0.7 |
| $CF_3SO_3^-$ | F | 98.6 | 1.0 |
| $BF_4^-$ | F | 99.7 | 0.6 |
| $PF_6^-$ | F | 99.7 | 0.6 |
| $SbF_6^-$ | F | ~100.0 | 0.2 |
| $FeCl_4^-$ | Cl | 99.7 | 0.1 |
| $ZnBr_4^{2-}$ | Br | 99.6 | 1.5 |

TABLE 4-continued

Results of the ion exchange in the case of I-10-Me-X ionenes

| counterion | Y | percentage of the ion exchange (%)[1] | drying loss (%)[2] |
|---|---|---|---|
| $[Fe(CN)_6]^{3-}$ | Fe | 93.9 | 5.0 |

[1]percentage of theory referred to the elementary analysis of Y
[2]statement in weight percent water loss after the samples had been dried at 40° C. under vacuum (2 mbar)

TABLE 5

Results of the ion exchange for various polymers

| ionics | Y | percentage of the ion exchange (%)[1] | drying loss (%)[2] |
|---|---|---|---|
| I-20-Me-TOS$^-$ | S | 92.6 | 3.6 |
| I-20-Me-BF$_4^-$ | F | ~100.0 | 0.7 |
| I-20-Me-PF$_6^-$ | F | 99.3 | 0.5 |
| I-20-Me-SbF$_6^-$ | F | 95.2 | 0.6 |
| I-20-Me-FeCl$_4^-$ | Cl | 93.9 | 1.1 |
| I-20-Me-ZnBr$_4^{2-}$ | Br | 98.8 | 0.7 |
| I-3-Me-BF$_4^-$ | F | 99.4 | 1.4 |
| I-3-Me-PF$_6^-$ | F | 96.0 | 0.7 |
| I-3-Me-SbF$_6^-$ | F | 96.8 | 0.7 |
| I-DABCO-6-TOS$^-$ | S | 92.5 | 4.8 |
| I-DABCO-6-BF$_4^-$ | F | 91.3 | 6.8 |
| I-DABCO-6-ZnBr$_4^{2-}$ | Br | ~100.0 | 3.5 |

[1]percentage of theory, referred to the elementary analysis of Y.
[2]statement in weight percent water loss after the samples had been dried at 40° C. under vacuum (mbar).

Figure 1:
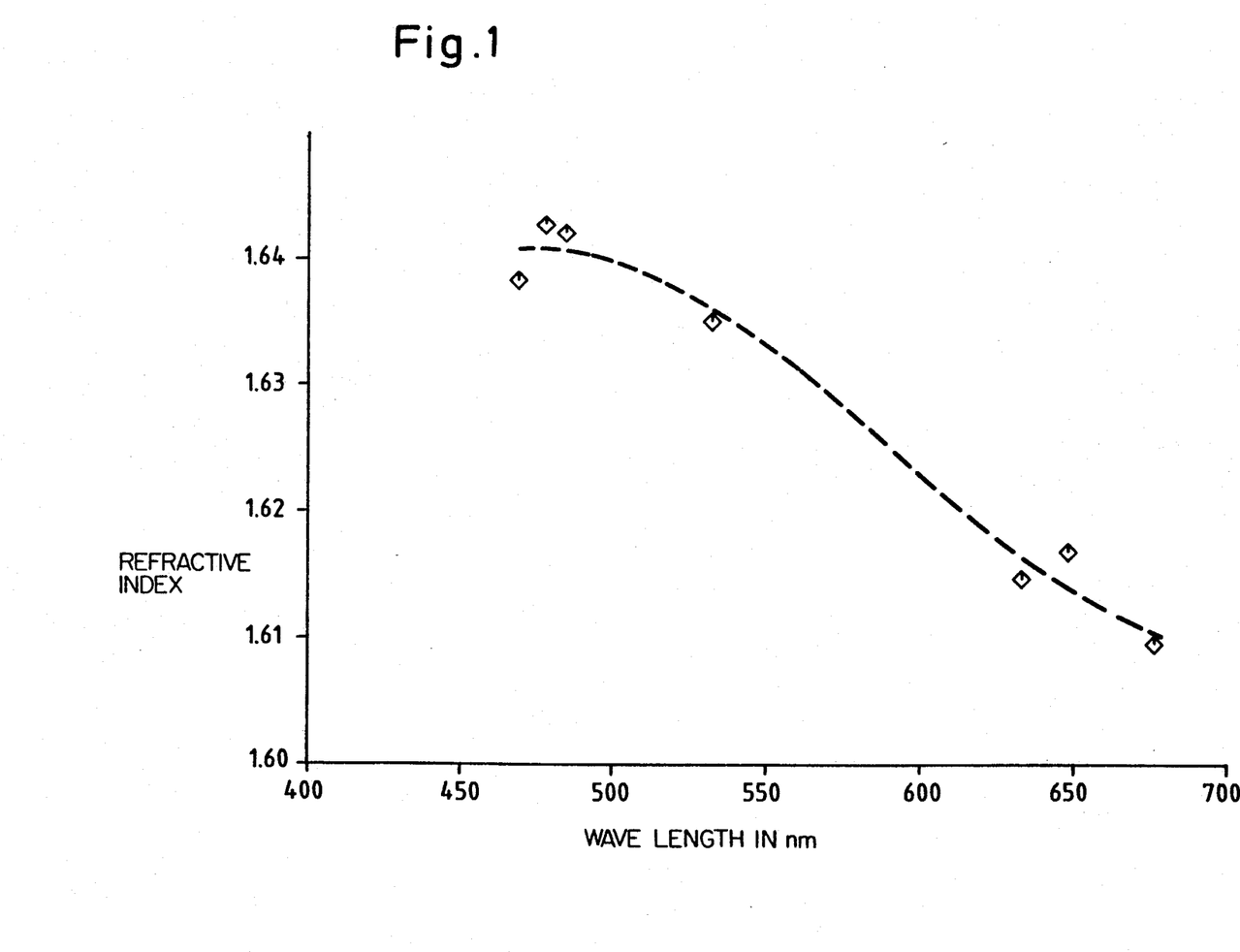
FIG. 1 illustrates the dispersion curve of the refractive index n for a polymer having the general formula I-6,10$_{star}$-Me-CdJ$_2$Br$_2$.
Figure 2:
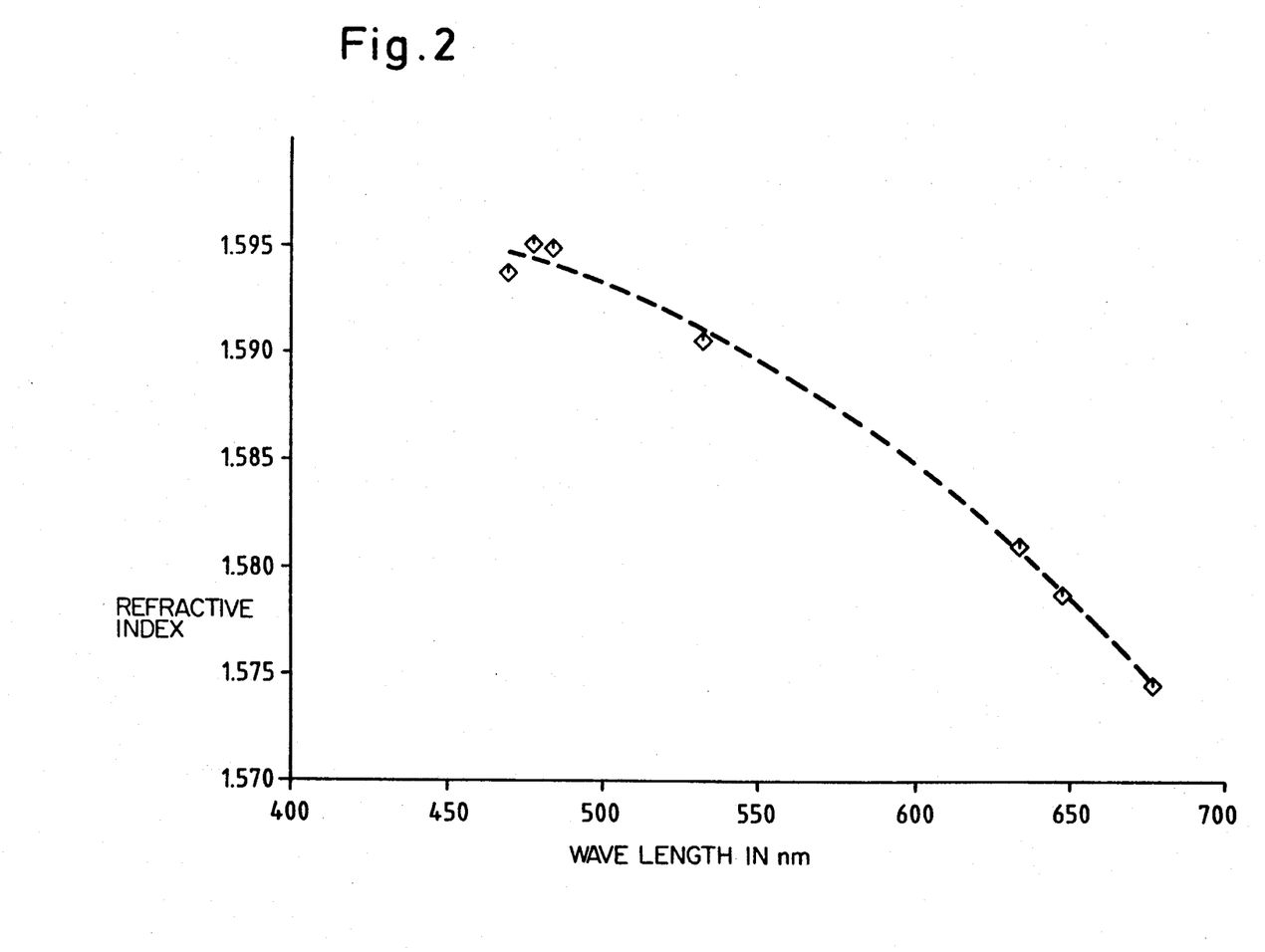
FIG. 2 illustrates the dispersion curve of the refractive index n for a polymer having the general formula I-6,10$_{star}$-Me-CdBr$_4$.
Figure 3:
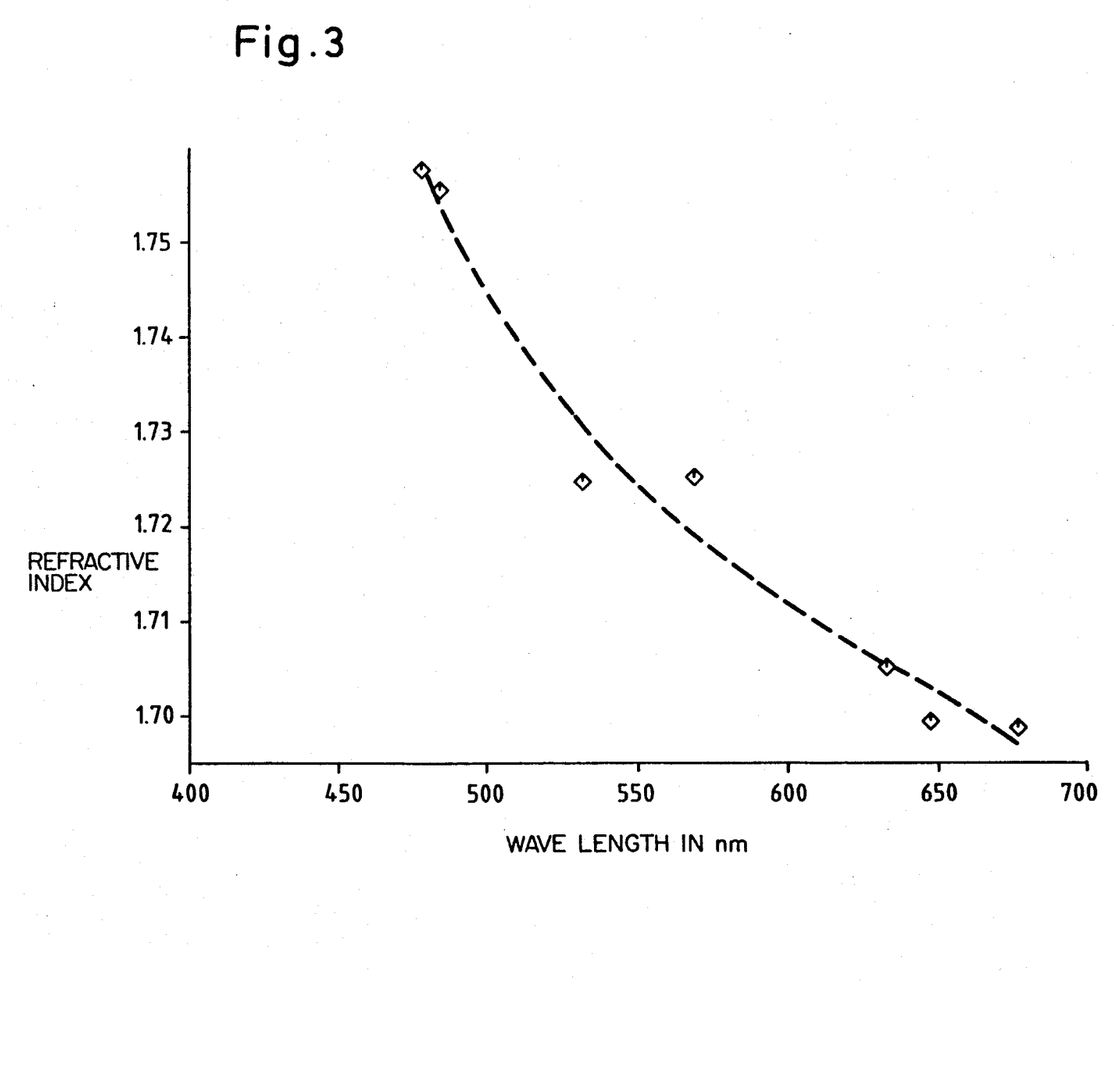
FIG. 3 illustrates the dispersion curve of the refractive index n for a polymer having the general formula I-6,10$_{star}$-Me-HgJ$_4$.
Figure 4:
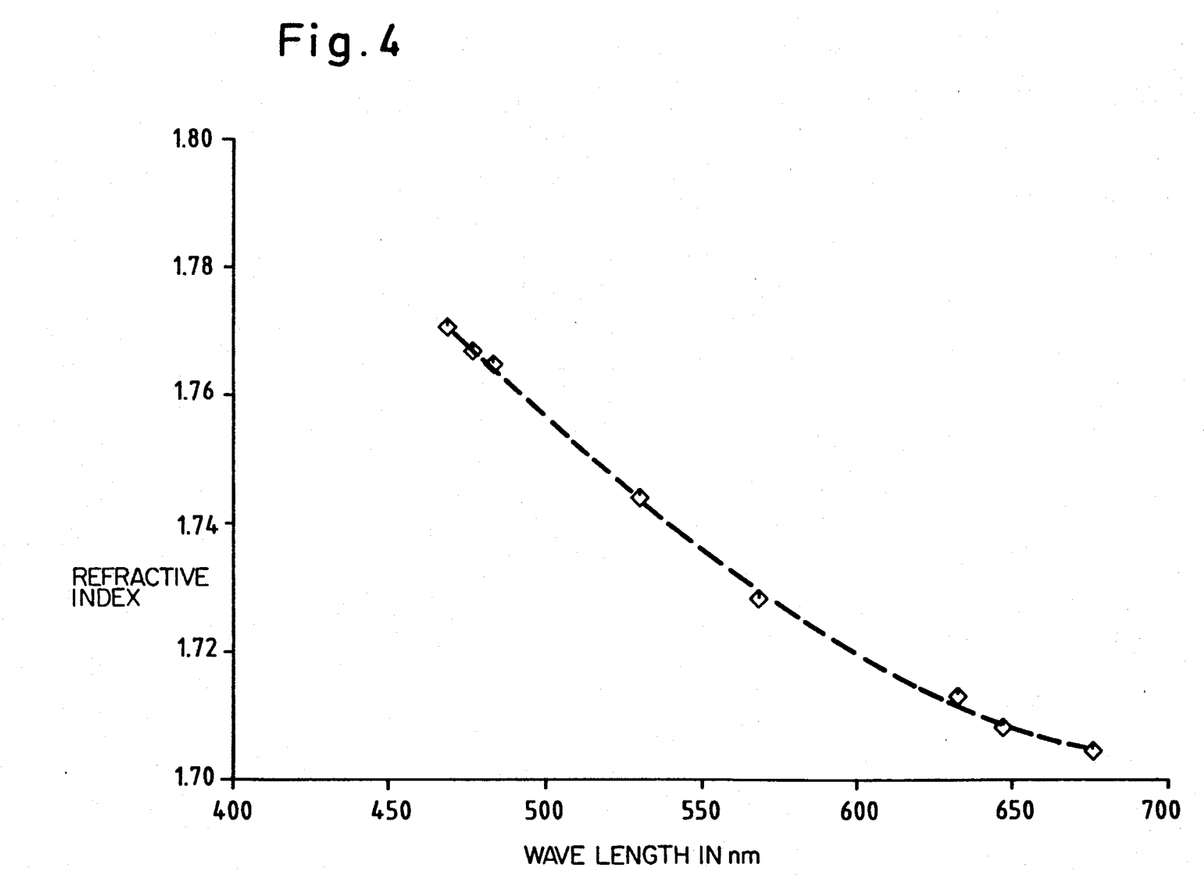
FIG. 4 illustrates the dispersion curve of the refractive index n for a polymer having the general formula I-6/Do-Et-HgJ$_4$.
Figure 5:
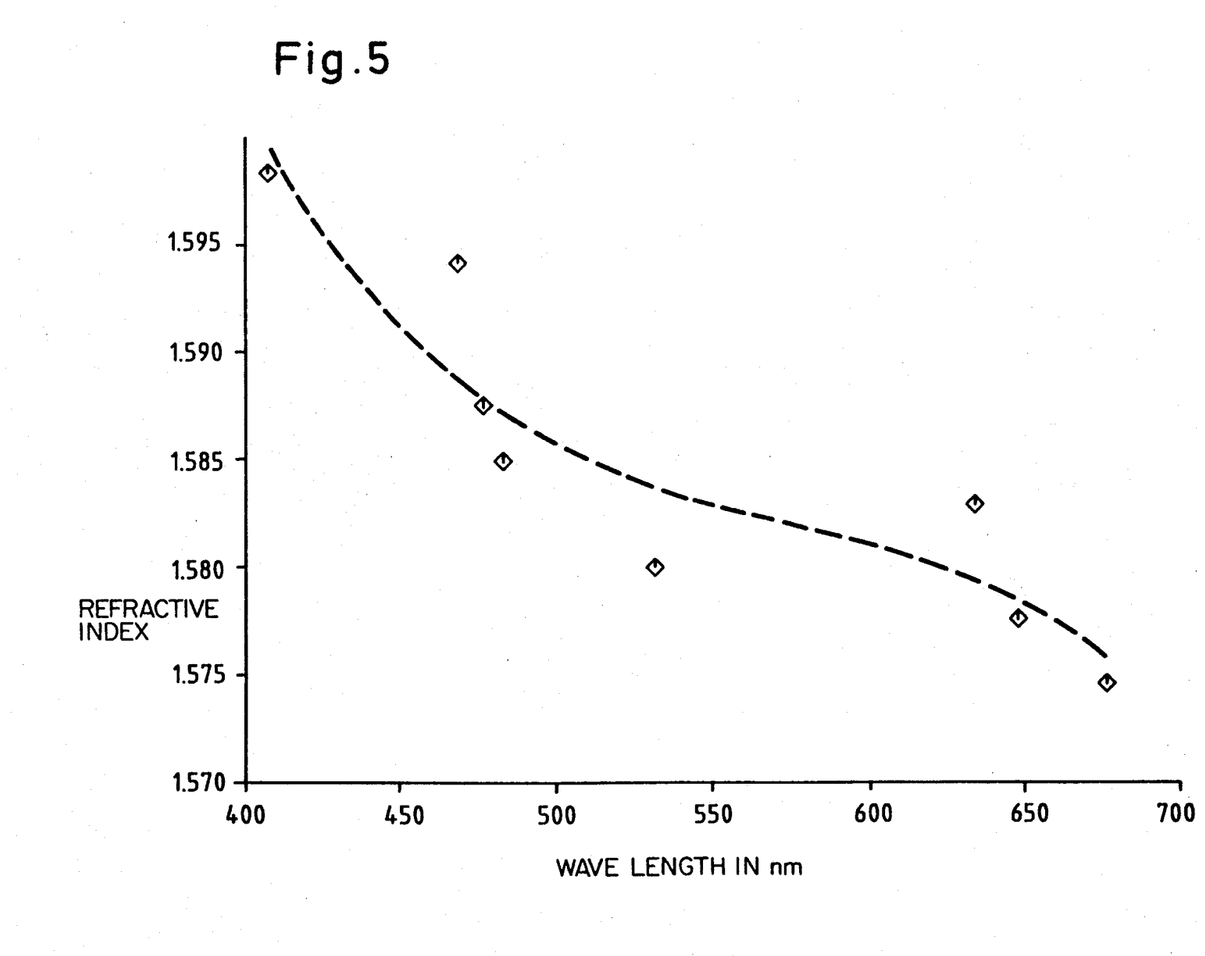
FIG. 5 illustrates the dispersion curve of the refractive index n for a polymer having the general formula I-10/Do-Me-ZnBr$_4$.
Figure 6:
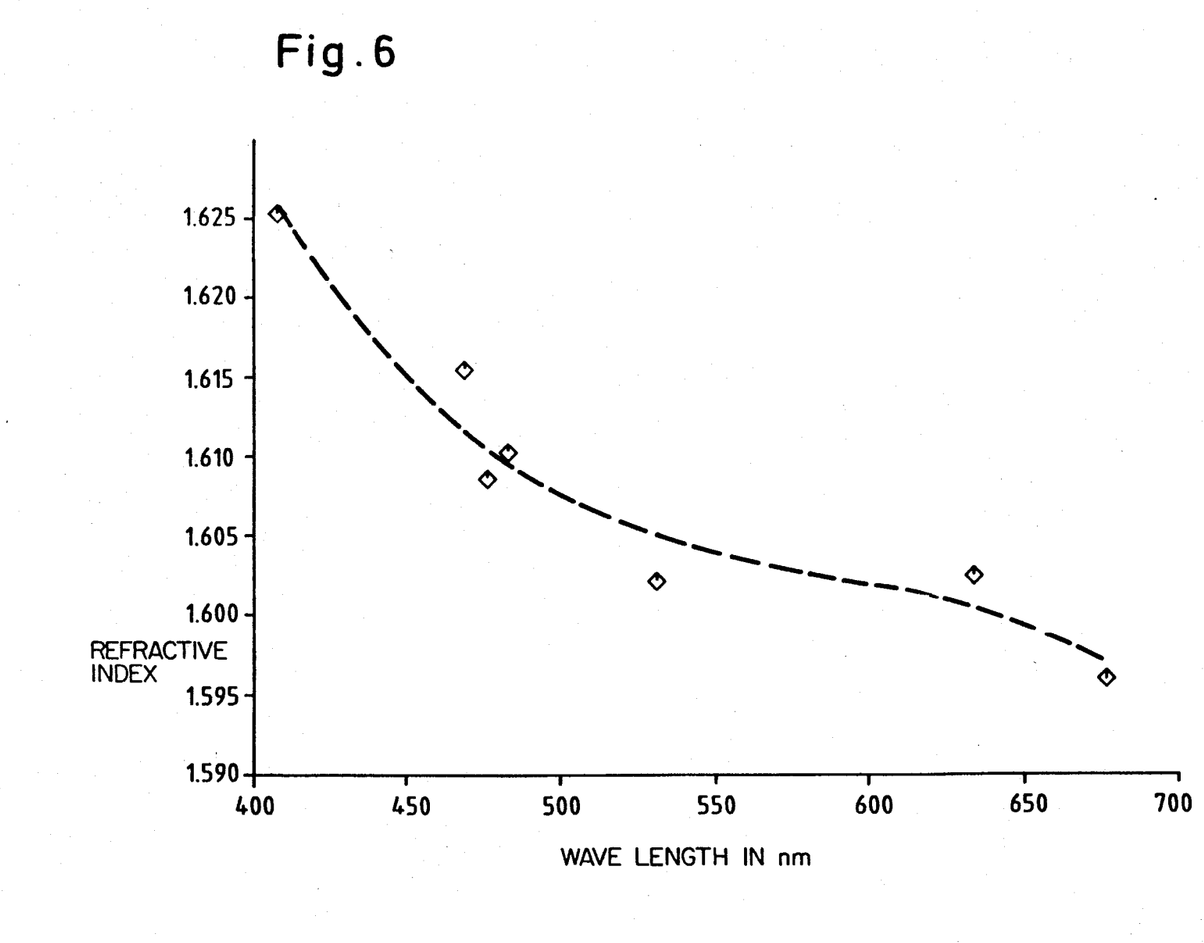
FIG. 6 illustrates the dispersion curve of the refractive index n for a polymer having the general formula I-Do/Pip-Me-CdBr$_4$.
Figure 7:
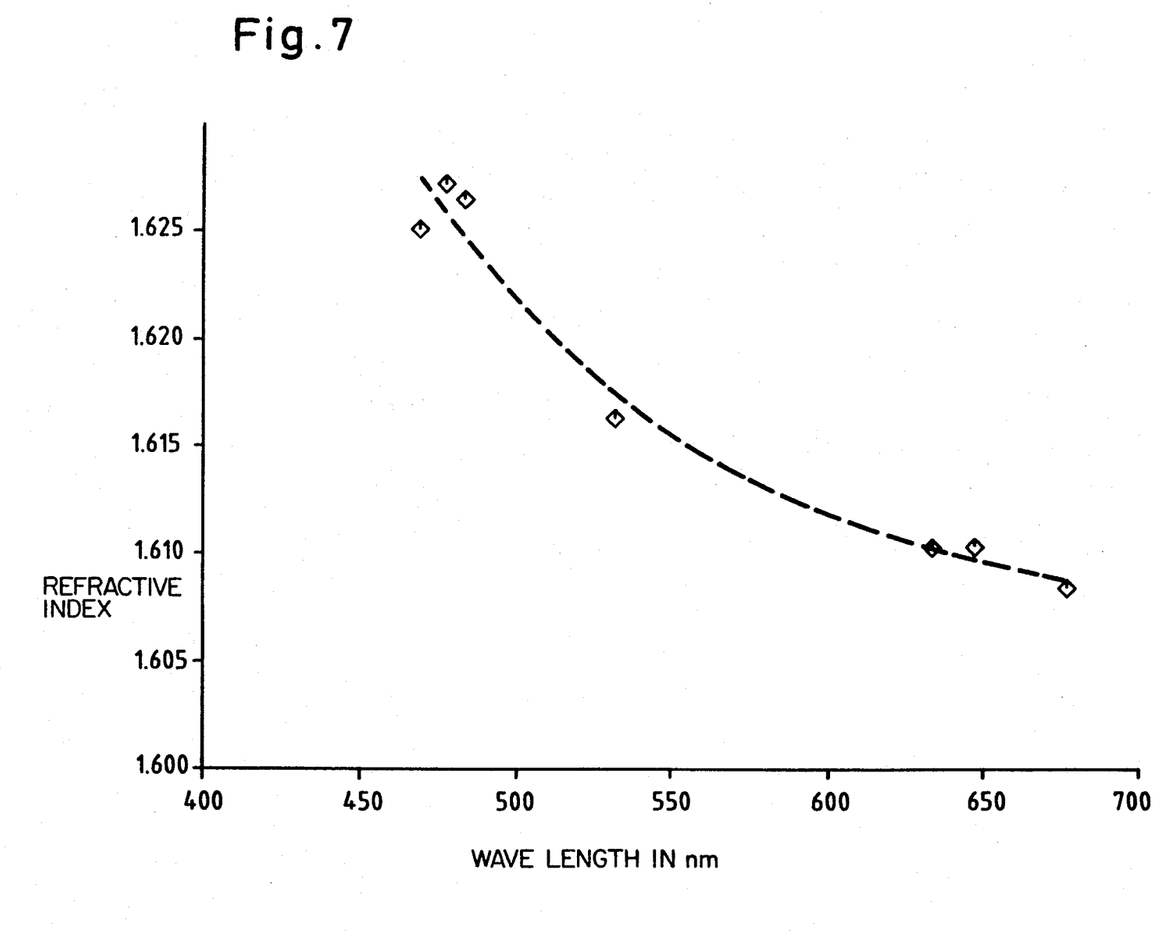
FIG. 7 illustrates the dispersion curve of the refractive index n for a polymer having the general formula I-Do/Pip-Me-BPh$_4$.

The following Examples are given for the purpose of illustrating the present invention and are to explain in more detail the preparation of the ions of general formula (I) according to the present invention in conjunction with FIGS. 1 to 7 of the accompanying drawings in which are shown the dispersion curves of the refractive indices of some of the substances according to the present invention. If not stated otherwise, statements of amount are parts by weight and percentages by weight.

EXAMPLE 1

Preparation of I-6-Me-TOS 1 g. (0.0048 mole) of I-6-Me-Br ions was dissolved in 50 ml. methanol and reacted with 1.34 g. (0.0048 mole) silver tosylate. The flask used was protected against light with aluminium foil in order to prevent the decomposition of the silver bromide. The solution was stirred for 30 minutes until the silver bromide (yellow powder) had precipitated out. It was filtered off through several membrane filters with pore sizes of from 5 to 0.2 μm. The polymer was precipitated out in acetone or in an acetone-diethyl ether mixture. The completeness of the ion exchange with silver salts can be monitored potentiometrically.

EXAMPLE 2

Preparation of I-6-Me-triflate 1.64 g. (0.096 mole) silver nitrate was dissolved in 50 ml. water and an aqueous solution of sodium hydroxide (0.38 g. sodium hydroxide; 0.096 mole) slowly added dropwise thereto. The silver oxide precipitates out as a black-brown powder. It is then decanted off and washed a few times with water. 2 g. I-6-Me-Br ions (0.096 mole) were dissolved in 50 ml. methanol and added to the moist silver oxide. The reaction took place with the exclusion of light. The silver bromide was filtered off. If the silver bromide particles are too small to be separated off by filtration, the solution is centrifuged at 4000 r.p.m. and subsequently filtered through a membrane filter of 0.2 μm. pore size. 1.67 ml. trifluoromethanesulphonic acid were slowly added dropwise thereto. The polymer was precipitated out from a diethyl ether-acetone mixture (1:1 v/v).

EXAMPLE 3

General method without the use of silver salts

The appropriate acid was slowly added dropwise to a solution of the polymer in methanol and the polymer with the new counterion precipitates out.

For the preparation of the ionics with counterions of the type $MY_4^{2-}$, the metal dihalides $MY_2$ were used.

EXAMPLE 4

Preparation of I-6-Me-ZnBr$_4^{2-}$

An alcoholic solution of zinc bromide was added dropwise to an alcoholic solution of I-6-Me-Br ionenes. The polymer precipitated out of the solution and was filtered off.

Analogously to the preceding Examples, starting from the appropriate ionenes and silver salts or acids/-salts with the desired counterion $X^-$ to be introduced, other ionenes according to the present invention can be prepared, for example the polymers of general formula (I) given in the preceding and following Tables.

The characterisation of the products took place by means of IR and NMR spectroscopy and by elementary analysis.

DETERMINATION OF THE REFRACTIVE INDEX

The refractive indices of the polymers according to the present invention were determined on thin films according to three different methods:
1. refractive index determination by means of interferometry combined with separate layer thickness determination;
2. refractive index determination by means of angle-dependent coupling-in as lightwave conductor;
3. refractive index determination via plasmon spectroscopy.

According to Method 2), on film samples of the ioueues according to the present invention could be demonstrated the possibility of use of the polymers according to the present invention as wave guides. This method represents the most accurate method for the determination of the refractive index (exactitude ±0.0005).

DESCRIPTION OF METHOD 1

The refractive index of the polymers according to the present invention was determined with the help of interferometry.

For this purpose, polymer films were produced by the evaporation of solutions of the polymers on microscope slides. The samples were dried overnight at 50° C. in a vacuum. The interferometric measurements were carried out with a simultaneous spectrometer of the firm Zeiss, Oberkochen, Federal Republic of Germany. In the case of this method, white light falls on the thin polymer layer. The beams reflected from the front and rear side interfer and a characteristic interference pattern results with minima of the intensity for the wavelength at which the partial beams destructively interfer and intensity maxima for the wavelengths at which constructive interference takes place. If no absorption of the light takes place, there applies:

$$2nd = m\lambda$$

$$2nd = \frac{\lambda_1 \lambda_2 P}{\lambda_1 - \lambda_2}$$

n = refractive index
d = thickness of the sample
m = ordinal number
$\lambda_1$, $\lambda_2$ = wavelengths of two maxima
P = period between two maxima.

According to the above-described method, there can only be determined the optical density, i.e. of product $n \times d = OD$. Therefore, in order to be able to calculate the refractive indices, the layer thicknesses of the investigated films are determined separately by means of a commercially available layer thickness measurement apparatus (Alphastep of the firm Tencor Instruments). Due to the inexactitude of the statement of the wavelength values of the intensity maxima and minima, the exactitude of the refractive index determination according to this method is, in all, limited to about ±5%.

In the following Table 6 are given the values of the refractive index determined according to this method for some polyelectrolytes according to the present invention.

TABLE 6

Refractive indices of ionenes

| Formula | Structure | counterion $X^-$ | refractive index n |
|---|---|---|---|
| I-6-Me—X | —(CH$_2$)$_6$—N$^+$(Me)(Me) X$^-$ | $CF_3SO_3^-$ | 1.44 |
| | | $BF_4^-$ | 1.60 |
| I-6/10$_{Star}$-Me—X | —(CH$_2$)$_{6/10}$—N$^+$(Me)(Me) X$^-$ (statistical copolymer) | $BF_4^-$ | 1.60 |
| | | ½ $ZnBr_4^{2-}$ | 1.60 |
| | | ½ $HgI_4^{2-}$ | 2.00 |
| I-10-Me—X | —(CH$_2$)$_{10}$—N$^+$(Me)(Me) X$^-$ | $BF_4^-$ | 1.65 |
| | | ½ $CdBr_4^{2-}$ | 1.65 |
| | | ½ $ZnBr_4^{2-}$ | 1.70 |
| | | ½ $HgI_4^{2-}$ | 1.78 |
| | | ½ $ZnI_4^{2-}$ | 1.79 |

TABLE 6-continued

| Formula | Structure | counterion $X^-$ | refractive index n |
|---|---|---|---|
| I-10/Do—Me—X | $-(CH_2)_{10}-\overset{\underset{\|}{Me}}{\underset{\underset{Me}{\|}}{N^+}}-CH_2-CH=CH-CH_2-\overset{\underset{\|}{Me}}{\underset{\underset{Me}{\|}}{N^+}}-\quad X^-$ | ½ $HgI_4^{2-}$ | 1.83 |
| I—DO/Pip—Me—X | $-CH_2-CH=CH-CH_2-\underset{X^-}{\overset{+}{N}}\underset{}{\overbrace{\phantom{xxx}}}H-(CH_2)_3-H\underset{}{\overbrace{\phantom{xxx}}}\overset{+}{N}-\underset{X^-}{\phantom{x}}$ with $CH_3$ groups | $PF_6^-$<br>$BF_4^-$ | 1.54<br>1.57 |

DESCRIPTION OF METHOD 2

The determination of the refractive index and the determination of the Abbé numbers took place by angle-dependent coupling-in of a light beam in a planar lightwave conductor according to the method of the "prism coupler". This method is especially suitable for the determination of optical data, such as refractive indices in thin, planar layers.

The method utilises the dependency of the coupling-in of a laser beam with the help of a prism in a planar layer from the angle $\theta$ which is formed between the incident beam and the base of the prism. Coupling-in of the light only takes place when this angle is so chosen that the phase velocity of the incident light is equal to the phase velocity of one of the characteristic modulos of the spreading out of light in the wave conductor.

On the other hand, by determination of the angle $\theta$ in the case of the light coupling-in, the characteristic constants of the wave conductor material can be calculated. Since neither the refractive index of the wave conductor material at a particular wavelength nor the layer thickness thereof are known, the characteristic constants are also calculated from the dispersion equation for planar wave conductors. The solution of this equation requires a certain amount of calculation work which makes necessary the use of a computor. Details for the evaluation of the prism coupler method are described in an article by R. Ulrich and R. Torge (Applied Optics, 12 (12), 2901/1973). By independent determination of the values $\theta$ for at least two modulos, the two unknowns, layer thickness and refractive index, can clearly be determined.

If the above-described method is carried out with light of different wavelengths, then the dispersion curve of the refractive indices can be determined and the Abbé numbers can thus also be calculated. The method is precise to at least ±0.0005.

In the following Table 7 are given the values of the refractive index ($n_D$) and of the Abbé number ($V_D$) determined according to this method for some of the polymers according to the present invention. FIGS. 1 to 7 of the accompanying drawings show the dispersion curves of the refractive indices n; for the determination, the polymers according to the present invention are used as wavelength conductors of about 0.0001 cm. thickness.

TABLE 7

| Formula | Structure | counterion $X^-$ | $n_{D1}/v_D$ |
|---|---|---|---|
| I-6/10$_{Star}$Me—X | $-(CH_2)_{6/10}-\overset{\underset{\|}{Me}}{\underset{\underset{Me}{\|}}{N^+}}-\quad X^-$ (statistical Copolymer) | ½ $CdI_2Br_2^{2-}$<br>½ $CdBr_4^{2-}$ | 1.6250/22.6<br>1.5858/35.9 |
| I-6/Do—Et—X | $-(CH_2)_6-\overset{\underset{\|}{Et}}{\underset{\underset{Et}{\|}}{N^+}}-CH_2-CH=CH-CH_2-\overset{\underset{\|}{Et}}{\underset{\underset{Et}{\|}}{N^+}}-\quad X^-\ \ X^-$ | ½ $HgI_4^{2-}$ | 1.7227/13.2 |
| I-10/Do—Me—X | $-(CH_2)_{10}-\overset{\underset{\|}{Me}}{\underset{\underset{Me}{\|}}{N^+}}-CH_2-CH=CH-CH_2-\overset{\underset{\|}{Me}}{\underset{\underset{Me}{\|}}{N^+}}-\quad X^-\ \ X^-$ | ½ $ZnBr_4^{2-}$ | 1.5814/65.0 |
| I—DO/Pip—Me—X | $-CH_2-CH=CH-CH_2-\underset{X^-}{\overset{+}{N}}\underset{}{\overbrace{\phantom{xxx}}}H-(CH_2)_3-H\underset{}{\overbrace{\phantom{xxx}}}\overset{+}{N}-\underset{X^-}{\phantom{x}}$ with $CH_3$ groups | ½ $CdBr_4^{2-}$<br>$BPh_4^-$ | 1.6025/59.7<br>1.6124/41.0 |

If the optical characteristic values ($n_D$, $v_D$) of the ionenes obtained are introduced into the $n_D$-$v_D$ diagram (cf. H. Dislich, loc. cit.), then it is clear that polymers according to the present invention cover a range which was hitherto only reserved for the inorganic glasses.

The polymers of general formula (I) according to the present invention can be worked up by means of various coating methods, for example by means of spin coating, to give thin films on various substrates, for example glass, or can be worked up from melts to give solid formed bodies, for example prisms or optical lenses, for example by injection moulding or by injection embossing processes (cf. for example G. Klepek, Kunststoffe, 77, 11/1987).

Because of their outstanding optical properties ("optical position" in the $n_D$-$v_D$ diagram) and especially because of the high values of the refractive index of up to about 2 to be achieved, the polymers of general formula (I) according to the present invention are outstandingly suitable for most varied optical uses. Their use is thereby not limited only to the lightwave spectrum but also extends to the ultraviolet spectral range.

In particular, the polymers produced according to the present invention find use as planar lightwave conductors, as optical constructional components, for example Fresnel lenses, lightwave conductors, as optical coatings and as sensors.

Because of their chemical, mechanical and optical properties, the polymers according to the present invention are also very suitable for aids to vision, such as optical lenses and, because of their physiological (bacteriostatic, bactericidal and cytotoxic) properties (cf. U.S. Pat. Nos. 3,899,534 and 3,928,823 and Swiss Patent Specification No. 606,191), especially for contact lenses, as well as for the production of glasses for protective glasses.

Therefore, the present invention is also concerned with the use of the polymers of general formula (I) according to the present invention as synthetic materials in optics and especially for the above-mentioned fileds of use.

We claim:

1. Optical devices comprising hard glass polymers having a high refractive index and low optical dispersion, said polymers having the general formula:

in which $R_1$ and $R_2$, which can be the same or different, are divalent organic radicals, $R_3$ and $R_4$, which can be the same or different, are monovalent organic radicals, n is a whole number greater than 2 and y is 0 or 1, and wherein $R_1$, $R_2$, $R_3$, $R_4$, and y and n together form a polymeric base structure which promotes glass formation and prevents crystallization, and $X^-$ is a mono- or polyvalent organic or non-halogen inorganic counter ion replacing an equivalent halogen ion and suitable for adjusting the solid body properties of the polymers.

* * * * *